(12) United States Patent
Pike et al.

(10) Patent No.: US 12,489,451 B2
(45) Date of Patent: Dec. 2, 2025

(54) MULTIPHASE CLOCK GENERATOR

(71) Applicant: CIENA CORPORATION, Hanover, MD (US)

(72) Inventors: Jacob Pike, Ottawa (CA); Sadok Aouini, Gatineau (CA); Naim Ben-Hamida, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 154 days.

(21) Appl. No.: 18/509,565

(22) Filed: Nov. 15, 2023

(65) Prior Publication Data

US 2025/0158623 A1    May 15, 2025

(51) Int. Cl.
*H03L 7/099* (2006.01)
*H04L 7/00* (2006.01)

(52) U.S. Cl.
CPC .......... *H03L 7/0998* (2013.01); *H04L 7/0025* (2013.01)

(58) Field of Classification Search
CPC ... H03L 7/0998; H04L 7/0025; H04L 7/0029; H04L 7/0033; H03M 1/207; G06F 1/10
USPC ......... 375/326–328, 373–376; 327/144, 147, 327/150, 152, 156, 159
See application file for complete search history.

(56) References Cited

U.S. PATENT DOCUMENTS

| | | |
|---|---|---|
| 5,914,996 A | 6/1999 | Huang |
| 7,864,080 B1 | 1/2011 | Demirsoy et al. |
| 9,876,489 B1 | 1/2018 | Casey et al. |
| 11,233,519 B1 | 1/2022 | Lam et al. |
| 2002/0009170 A1 | 1/2002 | Schmatz |
| 2008/0063124 A1 | 3/2008 | Song et al. |
| 2012/0033773 A1* | 2/2012 | Nedovic ............... H03L 7/0807 375/371 |
| 2013/0163701 A1 | 6/2013 | Buchwald et al. |
| 2013/0207707 A1 | 8/2013 | Agrawal et al. |
| 2014/0269783 A1 | 9/2014 | Bae et al. |
| 2017/0331619 A1 | 11/2017 | Azenkot et al. |

(Continued)

OTHER PUBLICATIONS

Yu, Zhengtao, et al., "A 610-M Hz FIR Filter Using Rotary Clock Technique", IEEE 2007 Custom Intergrated Circuits Conference (CICC), 2007, 4 pages.

(Continued)

*Primary Examiner* — Young T. Tse
(74) *Attorney, Agent, or Firm* — Guntin & Gust, PLC; Robert Gingher

(57) ABSTRACT

Aspects of the subject disclosure may include, for example, a multiphase clock generator having a plurality of digital phase interpolators each configured to create a generated clock signal according to an applied digital code, wherein a first digital code applied to a first digital phase interpolator and a second digital code applied to a second digital phase interpolator are chosen in a less precise range such that a first generated clock signal output by the first digital phase interpolator is as close to an ideal phase separation from a second generated clock signal output by the second digital phase interpolator, and wherein additional codes are applied to other digital phase interpolators in a more precise range to create generated clock signals having a deviation from an ideal separation from the first generated clock signal or the second generated clock signal that is less than a linear resolution of the applied digital code. Other embodiments are disclosed.

20 Claims, 16 Drawing Sheets

(56) References Cited

U.S. PATENT DOCUMENTS

| | | |
|---|---|---|
| 2018/0106889 A1 | 4/2018 | Schuck et al. |
| 2019/0058576 A1 | 2/2019 | Lim |
| 2019/0288830 A1 | 9/2019 | Zhuang et al. |
| 2019/0289241 A1* | 9/2019 | Saeki .................... H03M 1/123 |
| 2019/0334693 A1 | 10/2019 | Liu et al. |
| 2023/0006680 A1 | 1/2023 | Lam et al. |
| 2023/0138296 A1 | 5/2023 | Lee et al. |
| 2023/0246649 A1* | 8/2023 | Wang .................... H03L 7/0812 |
| 2024/0187008 A1 | 6/2024 | Pike et al. |
| 2025/0070789 A1 | 2/2025 | Pike et al. |

OTHER PUBLICATIONS

Chen, Wei-Chih, et al., "A 4-to-18GHz Active Poly Phase Filter Quadrature Clock Generator with Phase Error Correction in 5nm CMOS", Downloaded Jun. 13, 2022, 2 pages.

Chen, Stanley, et al., "Clock Generation for High-Speed Links", IEEE International Solid-State Circuits Conference (ISSCC); Session 25, 25.1, 2018, 3 pages.

Dalt, Nicola Da, et al., "On the Jitter Requirements of the Sampling Clock for Analog-to-Digital Converters", IEEE Transactions on Circuits and Systems-I: Fundamental Theory and Applications, vol. 49, No. 9, Sep. 2002, 7 pages.

Gangasani, G., et al., "Ultra-High-Speed Wireline", IEEE International Solid-State Circuits Conference (ISSCC); ISSCC 2022; Session 6, 6.5, 2022, 3 pages.

Goyal, Arun, et al., "A High-Resolution Digital Phase Interpolator based CDR with a Half-Rate Hybrid Phase Detector", Conference Paper, May 2019, 6 pages.

Guo, Z., et al., "Ultra-High-Speed Wireline", IEEE International Solid-State Circuits Conference (ISSCC); Session 6, 6.2, 2022, 3 pages.

Hafez, Amr Amin, et al., "Analysis and Design of Superharmonic Injection-Locked Multipath Ring Oscillators", IEEE Transactions on Circuits and Systems-I: Regular Papers, vol. 60, No. 7, Jul. 2013, 1712-1725.

Im, Jay, et al., "Ultra-High-Speed Wireline", IEEE International Solid-State Circuits Conference (ISSCC), Session 6, 6.1, 2020, 3 pages.

Rice, S. O., "Mathematical Analysis of Random Noise", Bell System Technical Journal, Downloaded on Jun. 18, 2023, 52 pages.

Segal, Yoav, et al., "Ultra-High-Speed Wireline", IEEE International Solid-State Circuits Conference (ISSCC); Session 6, 6.1, 2022, 3 pages.

Tyagi, Kshitiz, et al., "Performance Bounds of ADC-Based Receivers Due to Clock Jitter", IEEE Transactions on Circuits and Systems-II: Express Briefs, vol. 70, No. 5, May 2023, 5 pages.

Ye, Bingyi, et al., "Ultra-High-Speed Wireline", IEEE International Solid-State Circuits Conference (ISSCC); Session 6, 6.3, 2022, 3 pages.

Zand, Bahram, et al., "Ultra-High-Speed Wireline", IEEE International Solid-State Circuits Conference (ISSCC), 2022, 3 pages.

"International Search Report & Written Opinion for Application No. PCT/US2024/054897", Feb. 18, 2025, 15 pages.

Abdo, et al., "Low-Power Circuit for Measuring and Compensating Phase Interpolator Non-Linearity", 2019 IEEE 10th Annual Information Technology, Electronics and Mobile Communication Conference (IEMCON), IEEE, DOI: 10.1109/IEMCON.2019.8936145, Oct. 17, 2019, 4 pages.

Won, et al., "A 0.87 W Transceiver IC for 100 Gigabit Ethernet in 40 nm CMOS", IEEE Journal of Solid-State Circuits, IEEE, USA, vol. 50, No. 2, DOI: 10.1109/JSSC.2014.2369494, Feb. 1, 2015, 15 pages.

"Kaiser window", MATLAB kaiser, Printed Nov. 2022, 3 pages.

"Kaiser window", FIR filter design estimation parameters—MATLAB kaiserord, Printed Nov. 2022, 7 pages.

Guo, Z., et al., "6.2 A 112.5Gb/S ADC-DSP-Based PAM-4 Long-Reach Transceiver with >50dB Channel Loss in 5nm FinFET", ISSCC 2022 / Session 6 / Ultra-High-Speed Wireline / 6.2, 2022 IEEE International Solid-State Circuits Conference, 3 pp.

Jee, Dong-Woo, et al., "A FIR-Embedded Phase Interpolator Based Noise Filtering for Wide-Bandwidth Fractional-N PLL", IEEE Journal of Solid-State Circuits, vol. 48, No. 11, Nov. 2013, 10 pages.

Kong, Long, et al., "A 2.4-GHz RF Fractional-N Synthesizer With BW = 0.25 fREF", IEEE Journal of Solid-State Circuits, vol. 53, No. 6, Jun. 2018, 12 pages.

Monaco, Enrico, et al., "A 2-11 GHz 7-Bit High-Linearity Phase Rotator Based on Wideband Injection-Locking Multi-Phase Generation for High-Speed Serial Links in 28-nm CMOS FDSOI", IEEE Journal of Solid-State Circuits, Jul. 2017, 14 pages.

Narayanan, Aravind Tharayil, et al., "A Fractional-N Sub-Sampling PLL using a Pipelined Phase-Interpolator With an FoM of—250 dB", IEEE Journal of Solid-State Circuits, vol. 51, No. 7, Jul. 2016, 11 pages.

Rogers, Jonathan E., "200Gb/s Serial Transceiver Design: Challenges and Opportunities", IEEE International Solid-State Circuits Conference; Forum 4.2, 2022, 41 pages.

Wang, Zhaowen, et al., "Advanced Wireline Links and Techniques", IEEE International Solid-State Circuits Conference (ISSCC); Session 17, 17.6, 2022, 3 pages.

Zhao, Yu, et al., "Advanced Wireline Links and Techniques", IEEE International Solid-State Circuits Conference (ISSCC); Session 17, 17.4, 2022, 3 pages.

"International Search Report and Written Opinion received for PCT Application Serial No. PCT/US2024/055675", Mar. 10, 2025, 13 pages.

Lin, et al., "A High Speed, Low Power and Low Phase Noise Divider for Wideband Application", 2023 IEEE 15th International Conference on ASIC (ASICON), IEEE, DOI: 10.1109/ASICON58565.2023.10396383 section II entitled: "Proposed Clock Chain"; p. 1-p. 3; figure 3, Oct. 24, 2024, 4 Pages.

* cited by examiner

510

511

MULTIPHASE CLOCK GENERATOR

FIELD OF THE DISCLOSURE

The subject disclosure relates to a multiphase clock generator.

BACKGROUND

Data center demand for greater bandwidth continues to increase thereby requiring faster optical and electrical communication hardware. However, capacity and environmental concerns place a limit on the amount of power that such communication hardware may consume. Existing data centers are equipped to handle a limited amount of power from the grid. Current estimates suggest that data centers will consume 8% of the world's total power by 2030.

To limit the total power consumed in data centers, key hardware-namely Analog-to-Digital Converters (ADCs), Digital-to-Analog Converters (DACs) and Serializer-Deserializers (SerDes)—must increase their power in proportion with their speed. For example, a 224 Gigabit Per Second (Gb/s) Very Short Reach (VSR) SerDes is expected to consume 448 mW total, which corresponds to a power efficiency of 2 Picojoules Per Bit (pJ/b).

In addition to the power consumption, jitter and skew generated by a clocking path directly impacts the Signal-to-Noise and Distortion Ratio (SNDR) of the transmitted or received data. Jitter is a measure of how much a clock's edges vary between cycles. Skew is a fixed measure of how much a clock edge deviates from its ideal location. SNDR is impacted by both jitter and skew because they cause the sampling point to deviate from an ideal point in the data. The SNDR contribution due to jitter can be mathematically predicted based on the Nyquist frequency of the input data. Similarly, skew causes harmonics to appear in the output data spectrum, which further degrades the SNDR. Hence, these plural quantitative metrics: power, area, jitter, skew and SNDR, and other qualitative metrics (complexity, reliability, scalability) should be considered when designing and implementing multiphase clock generators.

BRIEF DESCRIPTION OF THE DRAWINGS

Reference will now be made to the accompanying drawings, which are not necessarily drawn to scale, and wherein.

DETAILED DESCRIPTION

Figure 1:
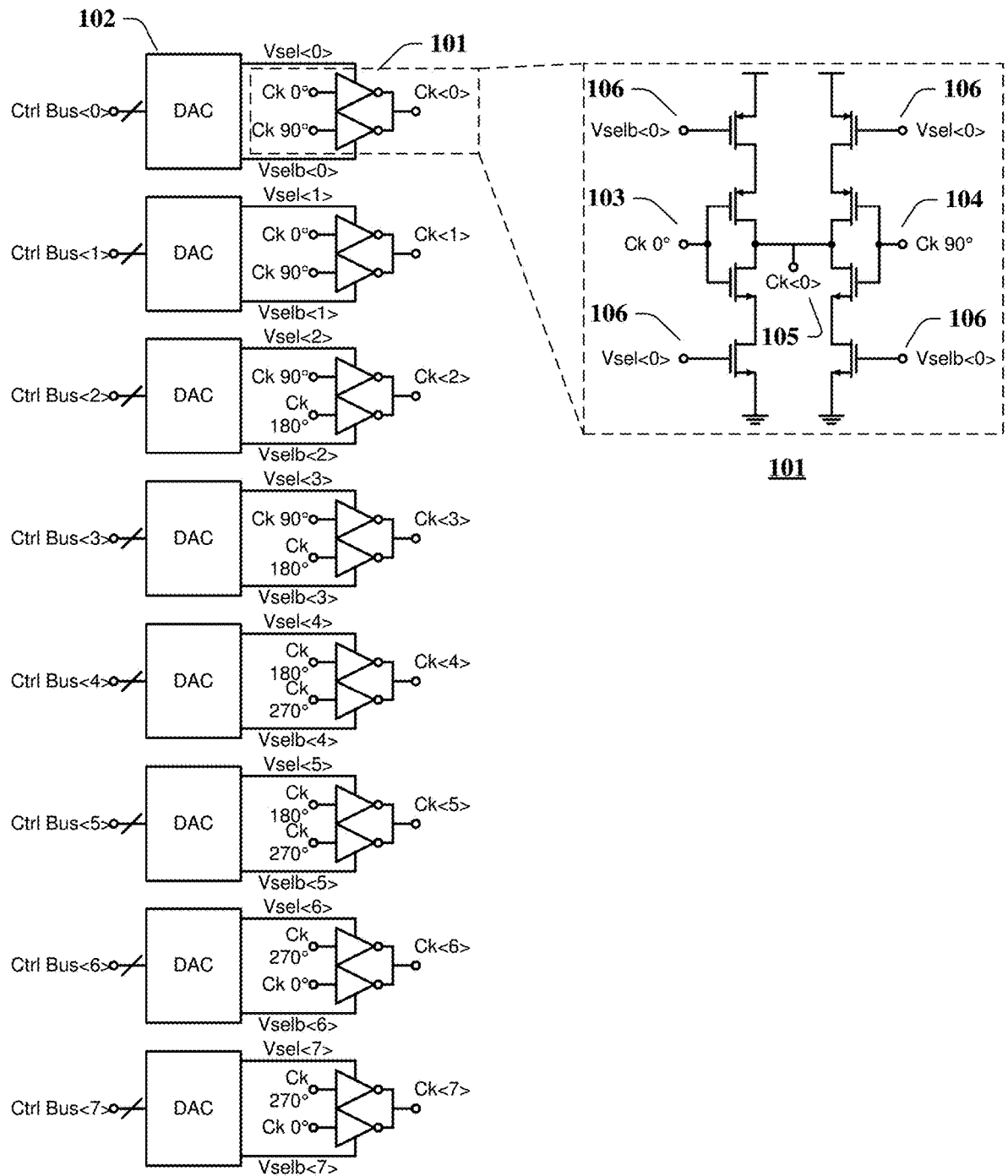
FIG. 1 is a block diagram illustrating an exemplary, non-limiting embodiment of a multiphase clock generator using analog phase interpolators.

The subject disclosure describes, among other things, illustrative embodiments for a multiphase clock generator (MPCG) comprising digital phase interpolators. Other embodiments are described in the subject disclosure.

One or more aspects of the subject disclosure include a multiphase clock generator having a plurality of digital phase interpolators each configured to create a generated clock signal according to an applied digital code, wherein a first digital code applied to a first digital phase interpolator and a second digital code applied to a second digital phase interpolator are chosen in a less precise range such that a first generated clock signal output by the first digital phase interpolator is as close to an ideal phase separation from a second generated clock signal output by the second digital phase interpolator, and wherein additional codes are applied to other digital phase interpolators in a more precise range to create generated clock signals having a deviation from an ideal separation from the first generated clock signal or the second generated clock signal that is less than a linear resolution of the applied digital code.

One or more aspects of the subject disclosure include a multiphase clock generator, having a plurality of digital phase interpolators each configured to create a generated clock signal according to an applied digital code, wherein each digital phase interpolator of the plurality of digital phase interpolators includes: a first input clock port; a second input clock port; an output clock port; a plurality of tri-state gates having thermometer weighting code ports; and a binary to thermometer decoder that converts the applied digital code into thermometer weighting code ports to control the plurality of tri-state gates to interpolate between a first clock signal applied to the first input clock port and a second clock signal applied to the second input clock port to create the generated clock signal, wherein the generated clock signal is provided to the output clock port.

One or more aspects of the subject disclosure include a method of: selecting, by a processing system including a processor, a first digital code and a second digital code in a less precise range of clock signals generated by a digital phase interpolator, wherein the first digital code and the second digital code are selected such that the digital phase interpolator generates clock signals having phase separation as close as possible to an ideal phase separation; applying, by the processing system, the first digital code to a first digital phase interpolator, which creates a first generated clock signal; applying, by the processing system, the second digital code to a second digital phase interpolator, which creates a second generated clock signal; selecting, by the processing system, additional codes for other digital phase interpolators in a more precise range to generate clock signals minimizing a deviation from an ideal separation from the first generated clock signal or the second generated clock signal, wherein the deviation is less than a linear resolution of the additional codes; and applying, by the processing system, the additional codes to the other digital phase interpolators.

FIG. 1 is a block diagram illustrating an exemplary, non-limiting embodiment of a multiphase clock generator using analog phase interpolators. As shown in FIG. 1, a basic analog phase interpolator (PI 101) consists of two (2) unit cells, each receiving a respective input clock signal 103, 104 that are phase offset by 90° or less. The output node of these unit cells is summed together to produce an output clock 105 whose phase is between the two input clock signals, depending upon an input analog select voltage 106 generated by a DAC 102 that receives a digital control signal. The analog select voltage 106 (Vsel/Vselb) controls the output clock phase value. As shown in FIG. 1, many analog PIs can be placed in parallel, and if quadrature clocks (spanning a full) 360° are available at the input, any number of phases can be produced at the output by varying the analog select voltage and the input clocks that are applied to each PI.

Due to the parallel generation of clock phases, jitter does not accumulate in each phase of the analog PI and therefore does not significantly impact the system SNDR. Additionally, analog PIs have a power consumption that is competitive with that of other technologies like injection-locked ring oscillators (ILROs) or delay-locked loops (DLLs). However, analog PIs are deficient when considering area and skew. While the PI itself is analog, the control word must come from a digital bus, hence each PI requires its own low-speed, high-resolution DAC to convert this digital control bus word into an analog voltage to control the PI. To achieve even a reasonable level of skew, several bits are required in each DAC. For example, given quadrature input clocks with a frequency of 7 GHz and a desired skew of <100 fs (to negligibly impact system SNDR), the DAC resolution needed is a 9-bit control word.

Therefore, to generate 8-to-16 clock signal phases (as required in modern wireline transceivers) a corresponding 8-to-16, 9-bit DACs are required. This relatively high number of DACs require a massive area on the chip, and the only way to reduce this area is to sacrifice skew resolution, which in turns impacts system SNDR.

Figure 2A:
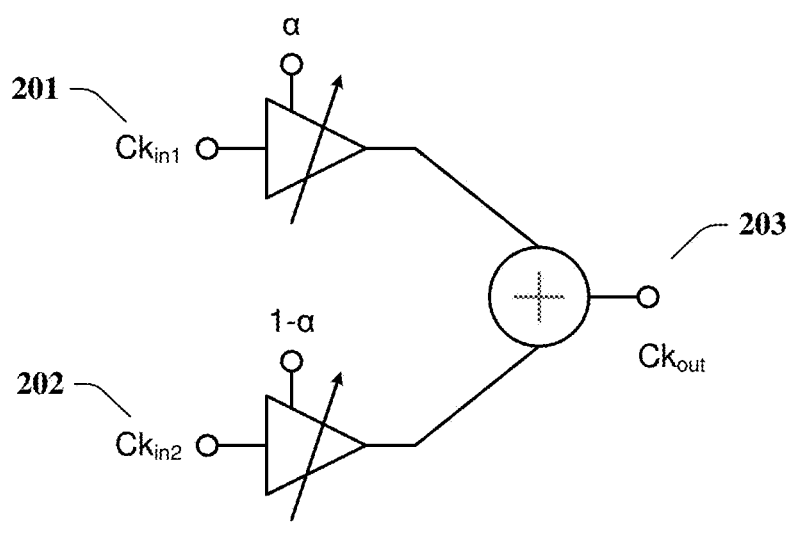
FIG. 2A is a block diagram illustrating an exemplary, non-limiting embodiment of a digital phase interpolator in accordance with various aspects described herein.

FIG. 2A is a block diagram illustrating an exemplary, non-limiting embodiment of a digital phase interpolator in accordance with various aspects described herein. As shown in FIG. 2A, a digital PI 200 takes a weighted sum of two input clocks 201, 202 ($CK_{in1}$ and $CK_{in2}$) with phases $\theta_1$ and $\theta_2$ respectively, to generate the output 203 ($CK_{out}$) having a phase $\theta_{out}$. Considering the clocks as phasors, the output is related to the input by $CK_{out}=(1-\alpha)(\cos\theta_1+j\sin\theta_1)+\alpha(\cos\theta_2+j\sin\theta_2)$. The weight factor $\alpha$ is between 0 and 1, so when the weight of $CK_{in1}$ is increased, the weight of $CK_{in2}$ is decreased by the same amount. This results in $\theta_{out}$ being closer to $\theta_1$ when $\alpha$ is low, and closer to $\theta_2$ when $\alpha$ is high.

Each half of a digital PI consists of parallel tristate inverters that are controlled by a digital control word such that the tristate inverters are entirely turned on or off to adjust the weighting factor $\alpha$. For an N-bit digital PI, there are $2^N$ unit cells in each bank and between the two banks a total of $2^N$ unit cells may be on at a time. For example, if $2^N$ unit cells are on in the even path, then no unit cells are on in the odd path and the even phase is passed directly to the output. At the other extreme if $2^N$ unit cells are on in the odd path, then no unit cells are on in the even path and the odd phase is passed directly to the output. In the middle of these two extremes $2^{(N-1)}$ unit cells are on in each path and the output phase is half-way between the two input phases.

Figure 2B:
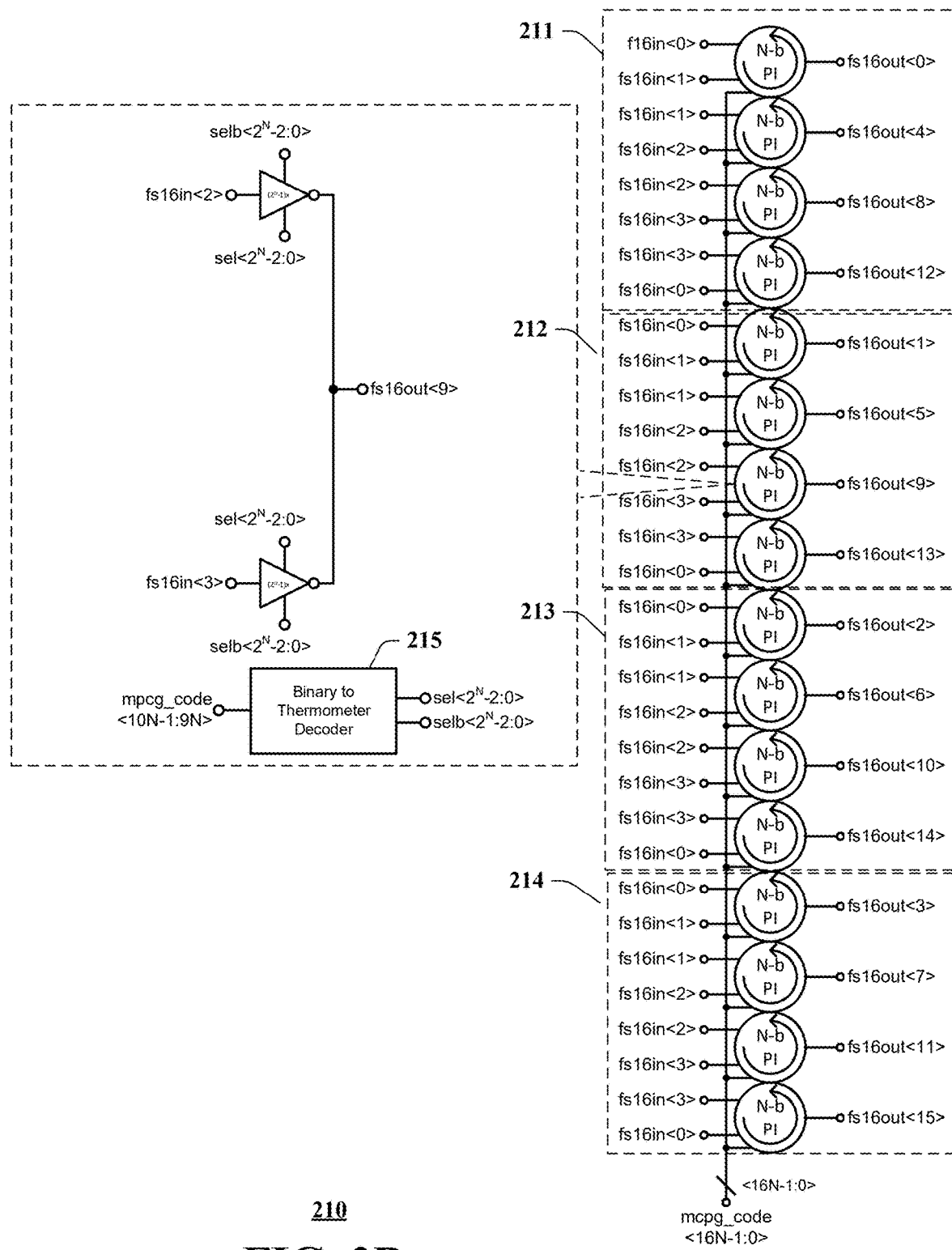
FIG. 2B is a block diagram illustrating an exemplary, non-limiting embodiment of a multiphase clock generator comprising digital phase interpolators and a binary to thermometer decoder in accordance with various aspects described herein.

FIG. 2B is a block diagram illustrating an exemplary, non-limiting embodiment of a multiphase clock generator comprising digital phase interpolators and a binary to thermometer decoder in accordance with various aspects described herein. FIG. 2B illustrates an MPCG 210 implemented with 4 banks 211, 212, 213, 214 of digital PIs, where each bank comprises 4 digital PIs, and where MPCG 210 uses a binary to thermometer decoder 215 for a weighting scheme. In an alternative embodiment, the digital PIs could be binary weighted, and no circuitry would be required between the digital PI and digital core.

The 16 digital PIs are connected in parallel to achieve any number of output phases. As shown in FIG. 2B, with quadrature input clocks (0°/90°/180°/270°), MPCG 210 uses the 16 parallel digital PIs to create 16 equally spaced output phases. Of these 16 PIs, a set of 4 PIs (one in each bank) use a pair of input clocks having phase 0° and 90°. The 4 PIs receive different control codes to get 4 output phases separated by 22.5°. Input clock pairs 90°/180°, 180°/270° and 270°/0° are also each passed into 4 PIs in each bank to complete the generation of 16 phases separated by 22.5°. Unlike in an analog PI implementation, where 16 individual DACs are required to hold the control voltage, the digital control word for each digital PI can come directly from the digital core without any (or minimal) intervening circuitry. Controlling each individual phase in a set of 16 digital PIs requires a bus of (16)(N) where N is the desired number of bits in the MPCG. If, for example, 9-bits of resolution are required, then a 144-bit wide digital bus would be necessary. Such a wide digital bus would require a large area spanning from the digital interface to the analog core.

Figure 2C:
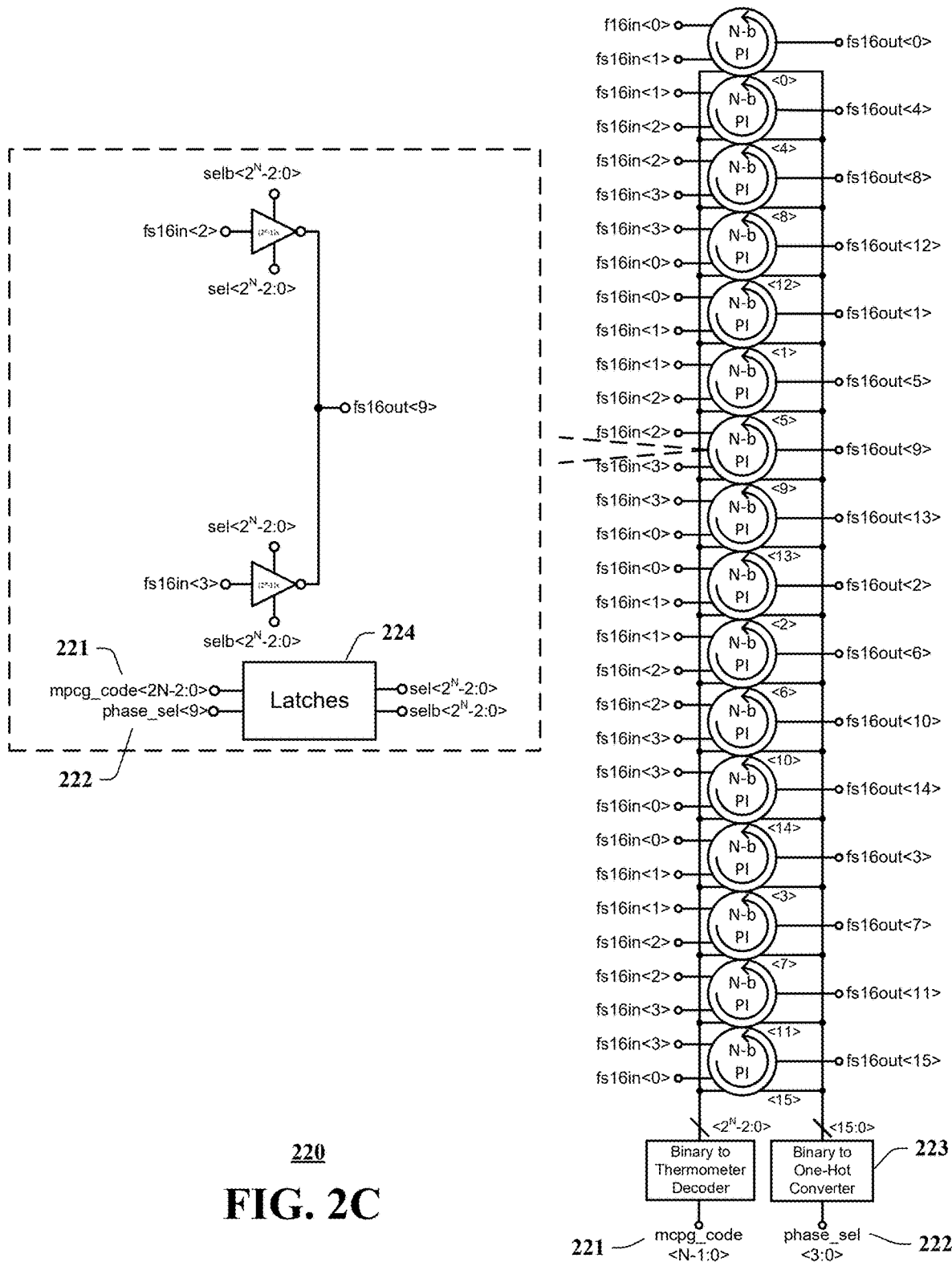
FIG. 2C is a block diagram illustrating an exemplary, non-limiting embodiment of a multiphase clock generator comprising digital phase interpolators and control code latches in accordance with various aspects described herein.

FIG. 2C is a block diagram illustrating an exemplary, non-limiting embodiment of a multiphase clock generator comprising digital phase interpolators and control code latches in accordance with various aspects described herein. FIG. 2C illustrates an MPCG 220 having a reduced width digital control bus 221 that has been achieved by including a phase select bus 222, a binary-to-one-hot converter 223 and latches 224. For example, instead of transmitting 16 N-bit buses from the core, a single N-bit control bus 221 can be transmitted with a 4-bit phase select bus 222. The 4-bit select bus 222 is passed into a binary-to-one-hot converter 223 to select which of the 16 digital PIs to apply the control code from the N-bit bus 221. Each digital PI also has a set of latches 224 to hold its control code. Once the first PI control code is set and the latches are holding the desired control word, control bus 221 and select bus 222 are updated in the digital core to select the next digital PI. This embodiment saves significant area, especially as more clocks with a greater degree of phase accuracy are required in wireline transceivers, because the area consumed by the addition of latches is far less than a 16× larger control bus. This embodiment can also be applied to analog PIs by placing the binary-to-one-hot converter and latches prior to the DACs.

In another embodiment, digital tri-state inverters may be used for deskew in addition to clock generation. As mentioned previously, to achieve sub-100 fs resolution in a digital PI with 7-GHz quadrature reference phases, at least 9-bits of resolution are required. Regardless of the method of implementation, a 9-bit digital PI will require a large area and power consumption. This area and power consumption problem can be avoided by cascading a coarse clock stage followed by a fine deskew stage. Where the coarse stage must cover a full 0°→90° range, the fine stage need only cover a subset of this range and thus can achieve a fine resolution without as many control bits.

There are two distinct ways that a fine deskew stage can be implemented while reusing the MPCG design and layout set forth schematically in FIG. 2C. Once the 22.5° reference phases are generated, another set of 16 digital inverters can be implemented with the input phases separated by 22.5°. Phase interpolating to produce clocks separated by 22.5° reduces the coverage range by a factor of 4, thus reducing the number of required bits by 2. Another method of implementing the fine stage is by passing the same clock into both the even and odd path of the digital tri-state inverter.

Figure 2D:
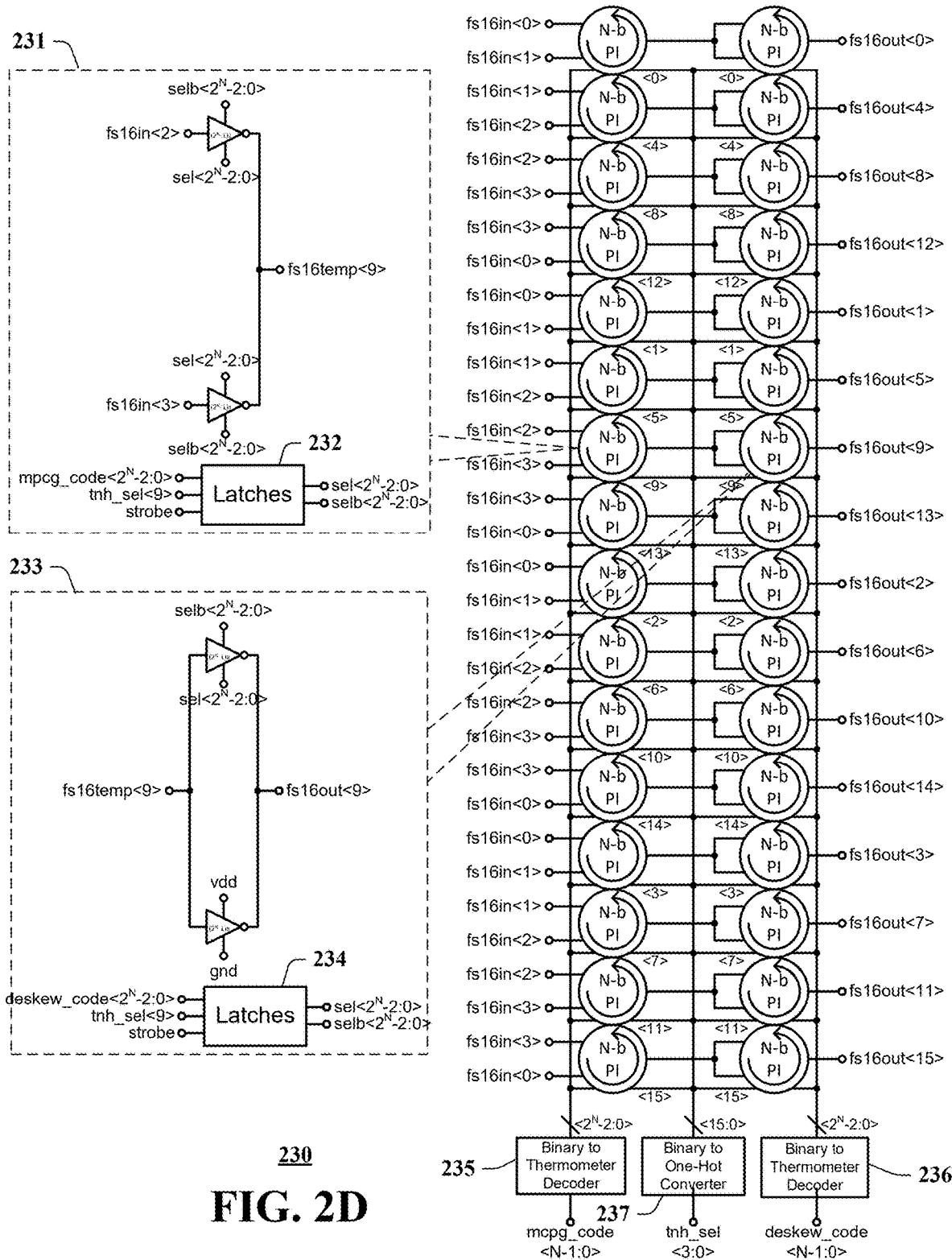
FIG. 2D is a block diagram illustrating an exemplary, non-limiting embodiment of a multiphase clock generator comprising digital phase interpolators, a deskew stage, and control code latches in accordance with various aspects described herein.

FIG. 2D is a block diagram illustrating an exemplary, non-limiting embodiment of a multiphase clock generator comprising digital phase interpolators, a deskew stage, and control code latches in accordance with various aspects described herein. As shown in FIG. 2D, MPCG 230 comprises a clock stage followed by a deskew stage. Each digital PI 231 of the clock stage comprises a latch 232. Each unit cell 233 of the deskew stage also comprises a latch 234. Binary to thermometer decoders 235 and 236 convert the binary code to control codes, and a binary to one-hot decoder 237 activates the latches. Notably, the layout and development testing of the deskew stage is the same as phase interpolator stage, because the same bank of tri-state inverters are implemented with only one small change. The change is that the same clock is connected to both clock inputs.

Instead of interpolating between two input clocks, MPCG 230 achieves deskewing in the unit cell 233 by changing an absolute delay in the tri-state inverters. One bank of unit cells is fixed to the "on" position so that the input clock is always passed through to the output. The other bank of unit cells has a variable delay. The ratio of fixed-to-variable drive strength controls the coverage range and resolution. For a fixed number of control bits, as the coverage range is increased (by increasing the fixed drive strength) the deskew resolution decreases. For this reason, it is imperative that the initial clock stage has little skew to begin with, so that the coverage range can be made small and the resolution high without using too many bits.

Two defining characteristics of PIs are their Differential Non-Linearity (DNL) and Integral Non-Linearity (INL). DNL is a measure of the output phase step for two subsequent codes relative to the ideal output phase step. INL is a measure of the output phase deviation from the ideal output phase.

Figure 3A:
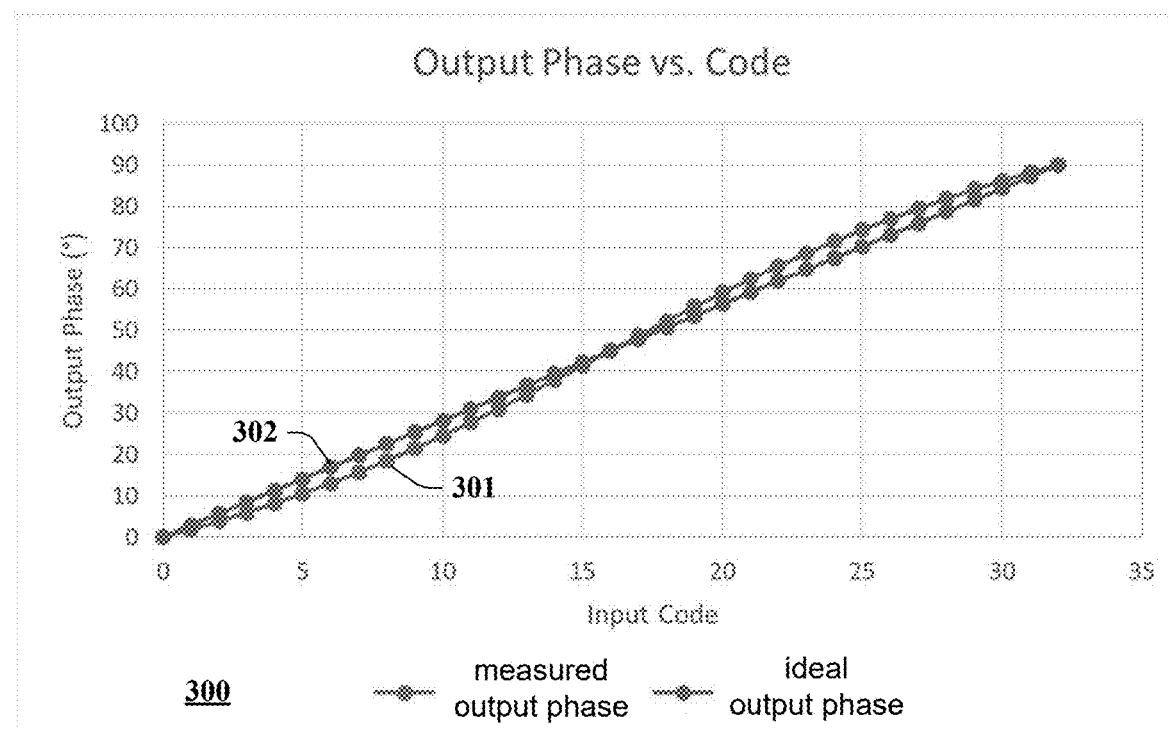
FIG. 3A is a graph of input code versus output phase for a five-bit digital phase interpolator in accordance with various aspects described herein.

FIG. 3A is a graph of input code versus output phase for a five-bit digital phase interpolator in accordance with various aspects described herein. As shown in FIG. 3A, in graph 300 a measured output phase 301 of a five-bit digital PI is plotted with an ideal output phase 302. The measured output phase 301 can be calculated as $\theta_{out}=\arctan(\alpha/(1-\alpha))$, where $\alpha$ is derived from the five-bit control code (i.e., code/31, to account for nonlinearities) and the ideal output phase 302 is linear (i.e., 90°×31/code).

Figure 3B:
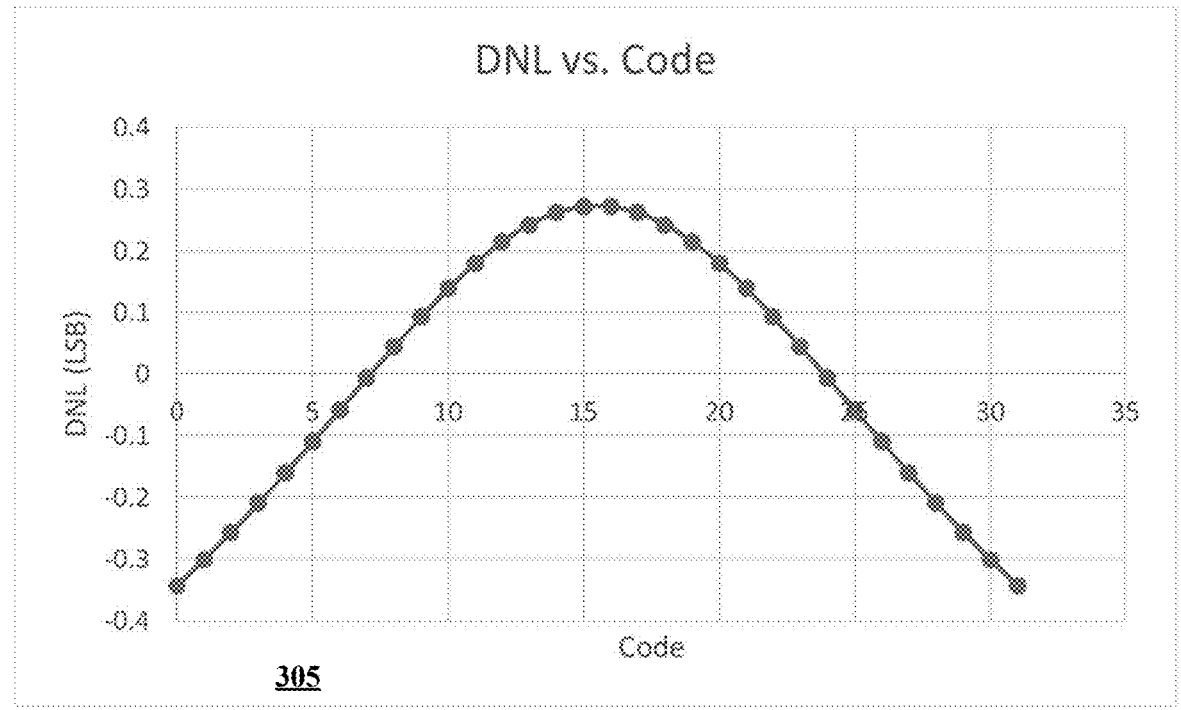
FIG. 3B is a graph illustrating a differential non-linearity of a five-bit digital phase interpolator in accordance with various aspects described herein.

FIG. 3B is a graph illustrating a differential non-linearity of a five-bit digital phase interpolator in accordance with various aspects described herein. The graph 305 illustrated in FIG. 3B shows the DNL calculated from the plot illustrated in FIG. 3A. Any points below 0 LSB indicate a smaller step size than nominal, while any points above 0 LSB indicate a larger step size than nominal. FIG. 3B reveals that for the first and last quarter span of codes, the PI output phase takes smaller steps than nominal while for the middle codes the PI output phase takes larger steps than nominal. In a practical implementation, layout impairments and device mismatches also result in more significant non-linearities than in theory. Therefore, more bits would be needed to realize a desired resolution than an ideal calculation would suggest. However, a non-linearity of a digital PI can be advantageously used.

A traditional method of calibrating the clocks is to select code 0 to represent output phase 0° and then select remaining codes to get as close as possible to the three other phases between 0° and 90° (i.e., 22.5°, 45° and 67.5°). However, since the steps in the middle span of codes, i.e., around 22.5°, 45° and 67.5°, are larger than around 0° and 90°, an optimal skew would not be achieved by the traditional method of calibration. Instead, an alternative calibration would select two codes that provide phases in the middle portion of the range (i.e., 22.5° and 45°) where there is less precision, such that the two phases have a separation that have a deviation from an ideal separation of 22.5° within an acceptable range. At modern data rates, skew is targeted around 100 fs to minimally impact system SNDR. At 7 Ghz, the skew would need to be about 0.25° or less. However, the MPCG shares the reduction of skew is shared between the clock stage and the deskew stage, so a few degrees (1-2° or less) of skew is acceptable from the clock stage alone. Then the end phases 0° and 67.5° can be selected by sweeping the codes in a more precise range where the steps between consecutive codes are finer and therefore reduce the error. This calibration method provides a more precise resolution that is closer to the smallest step size, i.e., $\arctan((½^N)/(1-½^N))$, instead of the linear resolution of $90°/2^N$. Given that linearity will be worse than predicted in a realistic implementation, the resolution can be improved further beyond a linear resolution.

For example, a digital PI having an applied digital code of five bits has a linear resolution of 2.8125° (i.e., $90/2^5$). If the nominal codes (0, 8, 16 and 24 illustrated in FIG. 3A) are selected, the digital PI would generate output phases of 0°, 18.43°, 45° and 71.56°, resulting in a total skew of 8.13° across the range of codes. By adjusting for the inherent nonlinearity of the digital PI, but still beginning with code 0 as a nominal reference (i.e., by selecting codes 0, 9, 16 and 23) the digital PI would generate corresponding output phases of 0°, 21.37°, 45° and 68.63°, resulting in a total skew of 2.26° across the range. However, by selecting the first and second quarter codes first and then adjusting for nonlinearity, (i.e., code 12 and 18, then code 4 and 25) the digital PI would generate output phases of 8.13°, 30.96°, 53.13° and 74.36° resulting in a total skew of 1.6°. By taking advantage of the digital PI's nonlinearity, the error in the range of phases that must be corrected by the deskew circuit can be significantly reduced without using additional bits in the applied digital code provided to the digital PI.

A similar calibration method can also be used with either of the previously described methods of fine deskew since non-linearity will be present in them as well. While multiple phases are not selected from the same non-linearity curve in the deskew stage, biasing phases towards ranges where the usage of early or late codes provides an even finer deskew than theoretically provided by the provisioned number of bits.

Nonlinearity in PIs is traditionally seen as unwanted and unavoidable. This calibration method takes advantage of unavoidable nonlinearity to reduce skew. Hence, resolution of the clock stage and/or deskew stage can be reduced, saving power, area and complexity.

Figure 4:
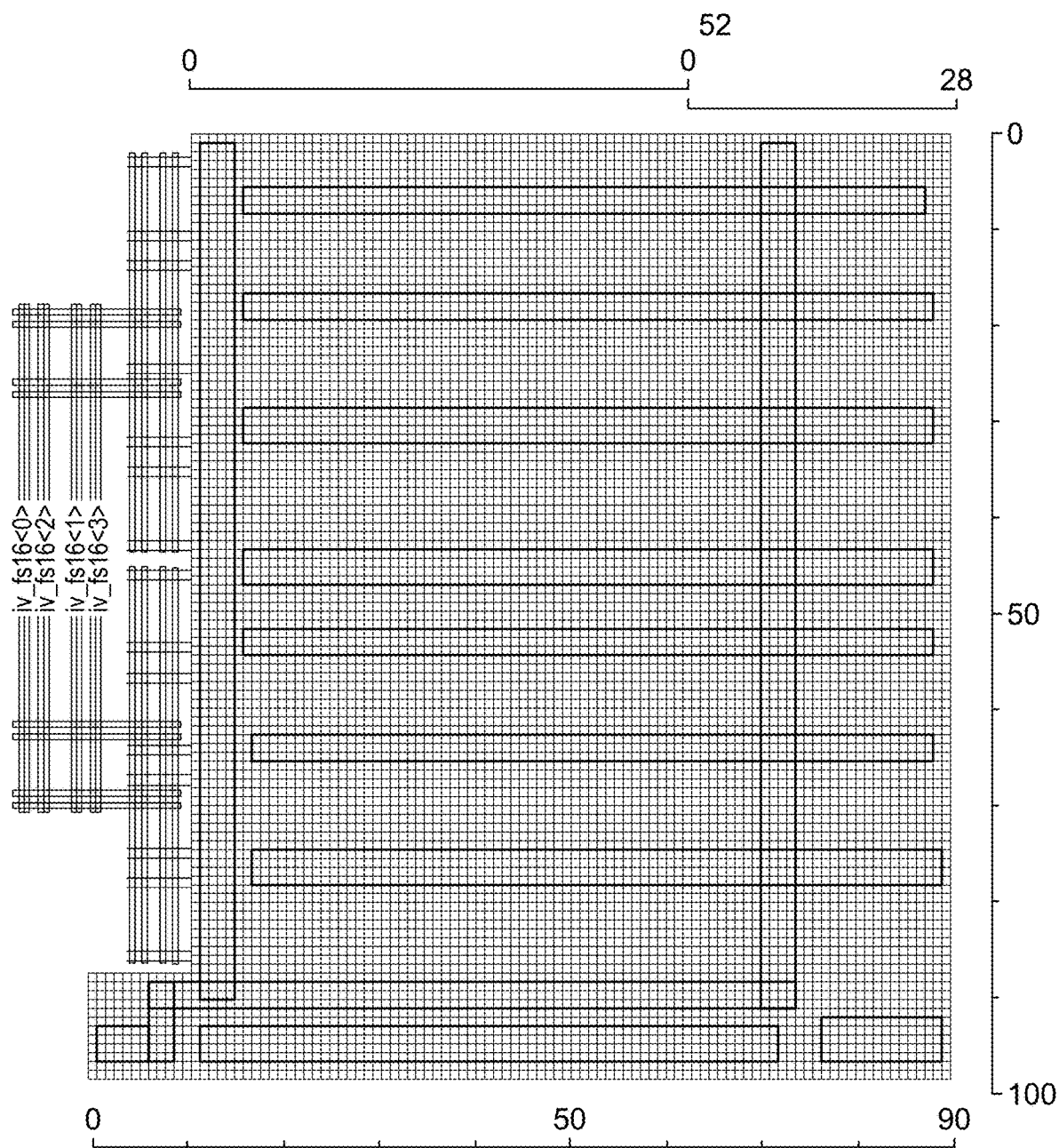
FIG. 4 is a diagram illustrating an exemplary, non-limiting embodiment of a multiphase clock generator comprising digital phase interpolators, a deskew stage, and control code latches in accordance with various aspects described herein.

FIG. 4 is a diagram illustrating an exemplary, non-limiting embodiment of a multiphase clock generator comprising digital phase interpolators, a deskew stage, and control code latches in accordance with various aspects described herein. An MPCG schematically illustrated by FIG. 2D was implemented in a 3 nm process as part of a test chip submission in May 2023. In this implementation 6-bits were dedicated to a clock stage and 5-bits to a deskew stage. Four clock phases separated by 90° were passed into the clock stage to generate 16 output phases, each separated by 22.5°. The complete layout illustrated in FIG. 4 uses a total area of 90 μm×100 μm, of which $\frac{2}{3}^{rds}$ is used for the clock stage and $\frac{1}{3}^{rd}$ for the deskew stage. This is a very small area for a 16-phase clock generation and deskew and helps the overall inner clock generation fit in a small area on the test chip.

In an embodiment, the MPCG/deskew circuit illustrated in FIG. 2D has been simulated in Cadence Virtuoso using the Spectre-X simulator. The simulation has been designed to operate from 3.5-to-10-GHz to support 56-to-224-Gb/s data transmission on the electrical side and up to 160-GS/s data transmission on the optical side.

Figure 5A:
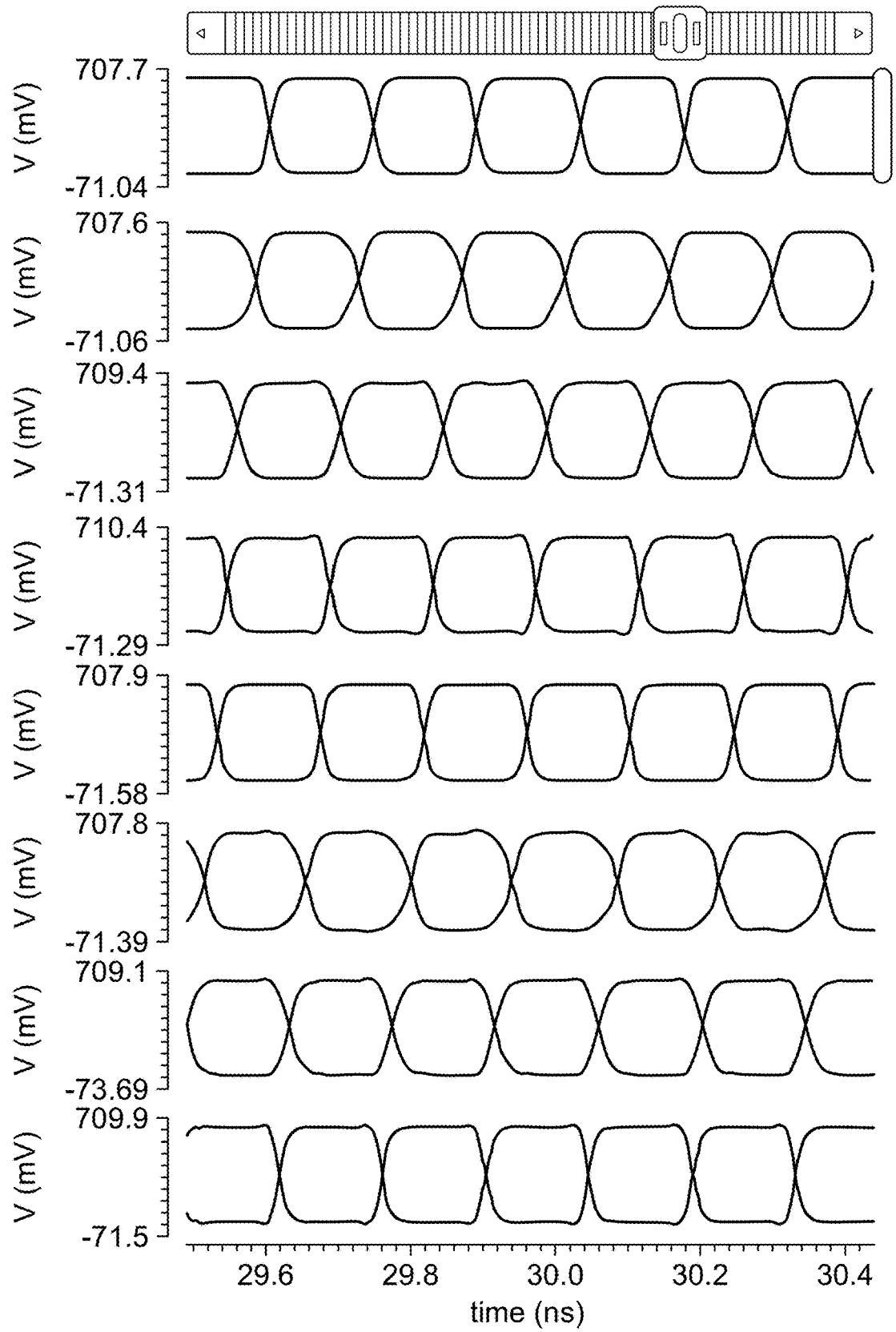
FIG. 5A illustrates a graph of simulated output clock signals from the MPCG/deskew circuit of FIG. 2D operating at 3.5- and 7-GHz.
Figure 5A:
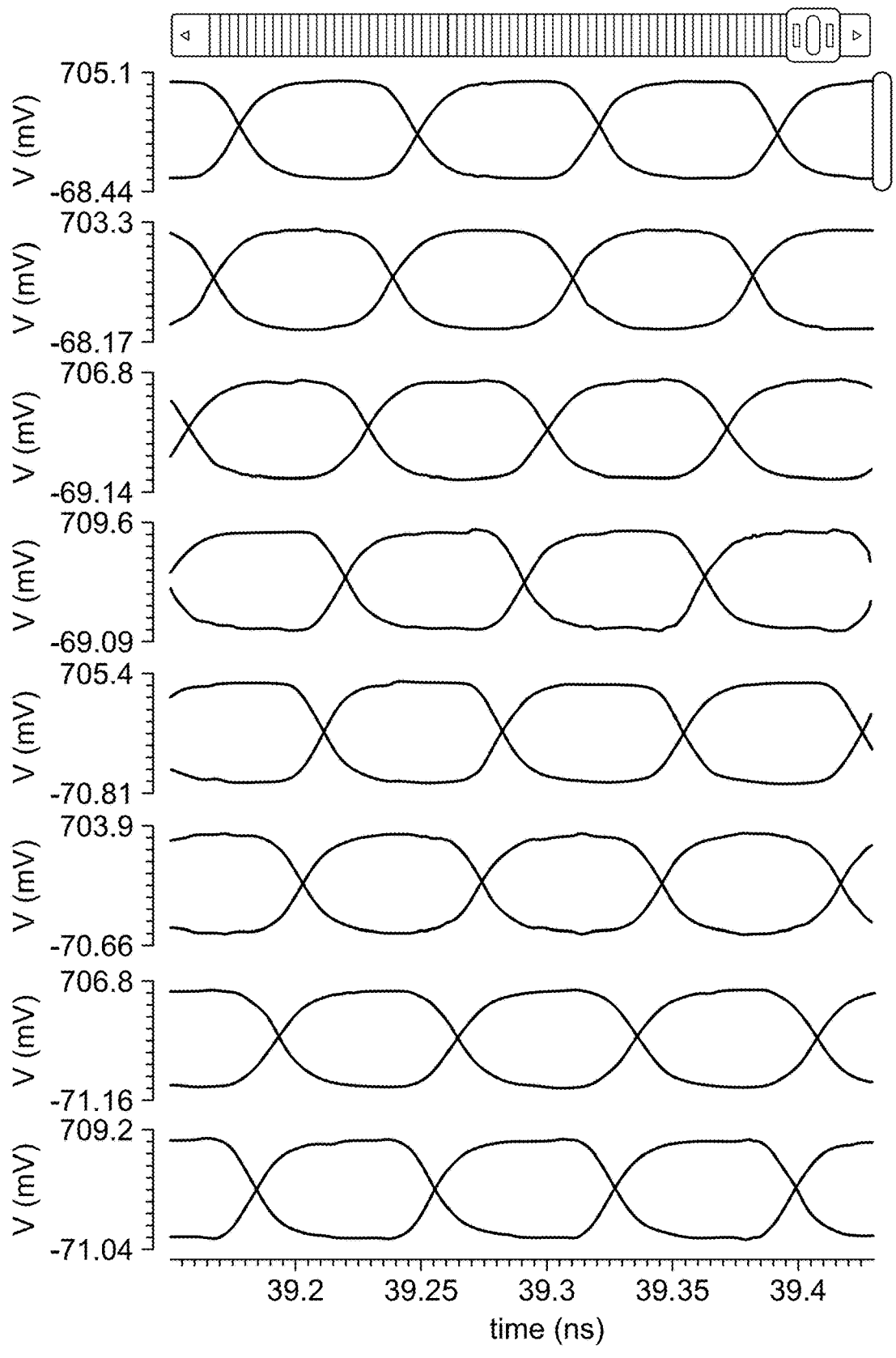

FIG. 5A illustrates a graph of simulated output clock signals from the MPCG/deskew circuit of FIG. 2D operating at 3.5- and 7-GHz. Graph 500 shows clocks at 3.5-GHz and graph 501 shows clocks at 7-GHz corresponding to 112- and 224-Gb/s operation, respectively.

Figure 5B:
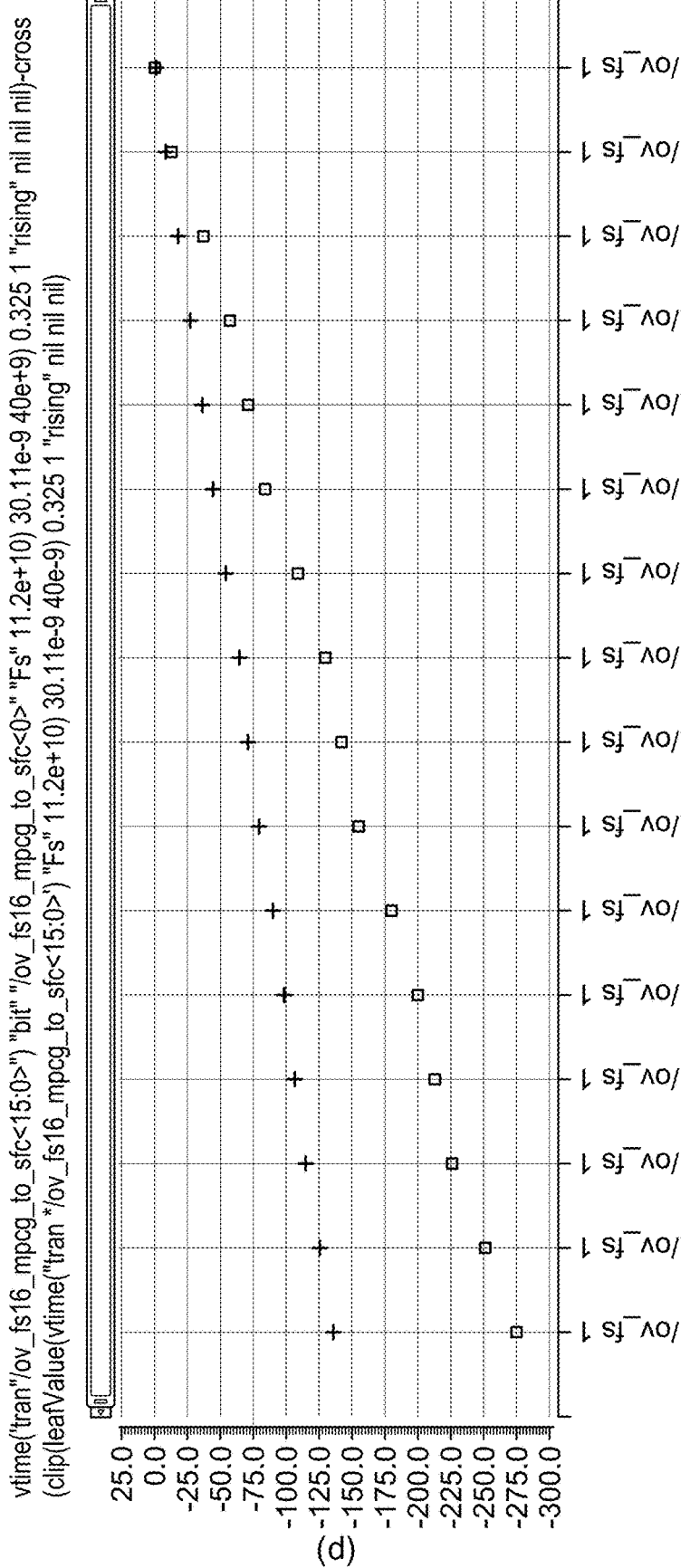
FIG. 5B illustrates a graph of timing delta between MPCG/deskew output phases at 3.5-GHz and 7-GHz.

FIG. 5B illustrates a graph of timing delta between MPCG/deskew output phases at 3.5-GHz and 7-GHz. The simulated timing delta between phase <0> and the remaining 15 phases can be seen on graph 502. The linearity of the yellow and red curves demonstrates that the MPCG/deskew can generate accurate phases with minimal skew.

Figure 5C:
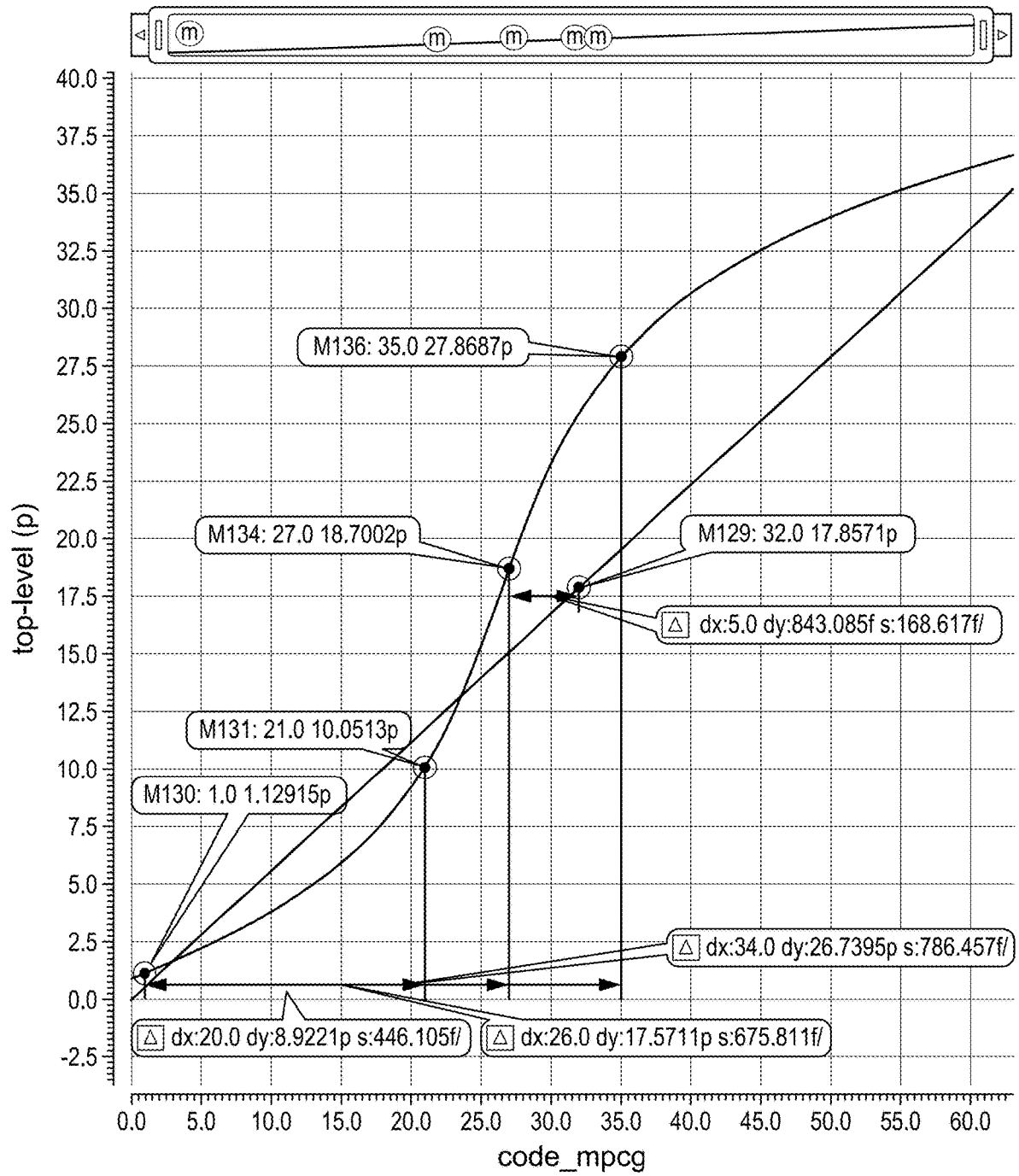
FIG. 5C illustrates a graph of a linearity curve for a six-bit clock stage operating at 7-GHz.

FIG. 5C illustrates a graph of a linearity curve for a six-bit clock stage operating at 7-GHz. Graph 503 shows a simulated output phase (in seconds) of the six-bit clock stage versus code @ 7-GHZ (in teal), and the ideal output phase (in seconds) versus code (in green). Delta markers are placed to highlight the skew. Ideal delta markers would be at 8.93 ps, 17.86 ps and 26.79 ps. Simulated delta markers are at 8.92 ps, 17.57 ps and 26.74 ps. This small difference demonstrates a skew of 290 fs (17.86 ps-17.57 ps). The simulated output phase (in seconds) is measured versus code and shown against the ideal output phase. As shown by graph 503, the simulated output phase is rather non-linear, but the max skew is only 290 fs (or ~0.73°) if the calibration method described above is used.

Figure 5D:
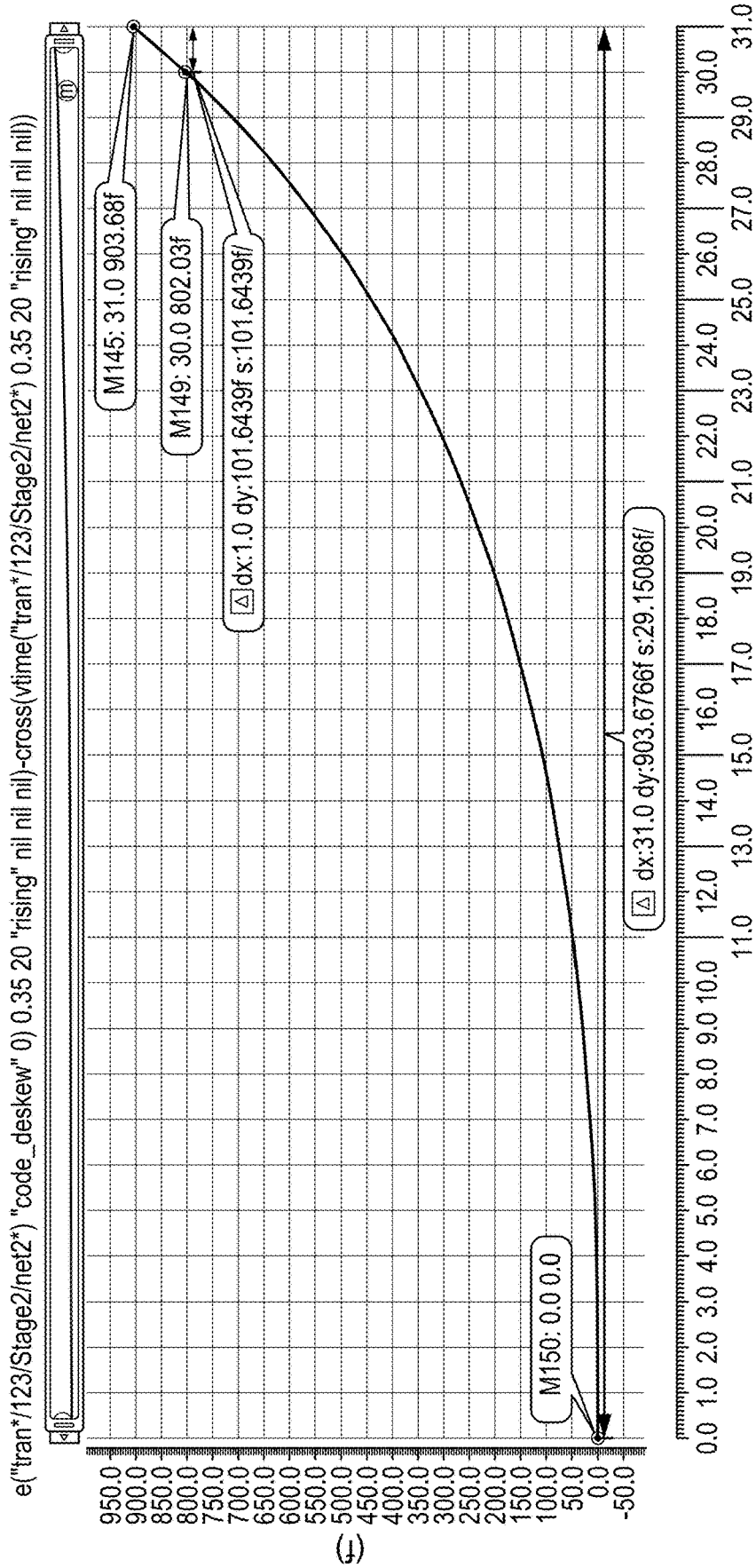
FIG. 5D is a graph that illustrates simulated output phase (in seconds) of a five-bit deskew versus code.

FIG. 5D is a graph that illustrates simulated output phase (in seconds) of a five-bit deskew versus code. Full coverage is 904 fs while taking a maximum step of 101 fs. The linearity curve for the five-bit deskew stage can be seen in graph 504. The deskew covers a range of 904 fs with a maximum step size of 101 fs. Given the skew performance of the clock stage, the entire 904 fs range is not needed and the deskew can be sub-ranged such that steps in the range of 10 fs can be achieved.

Figure 5E:
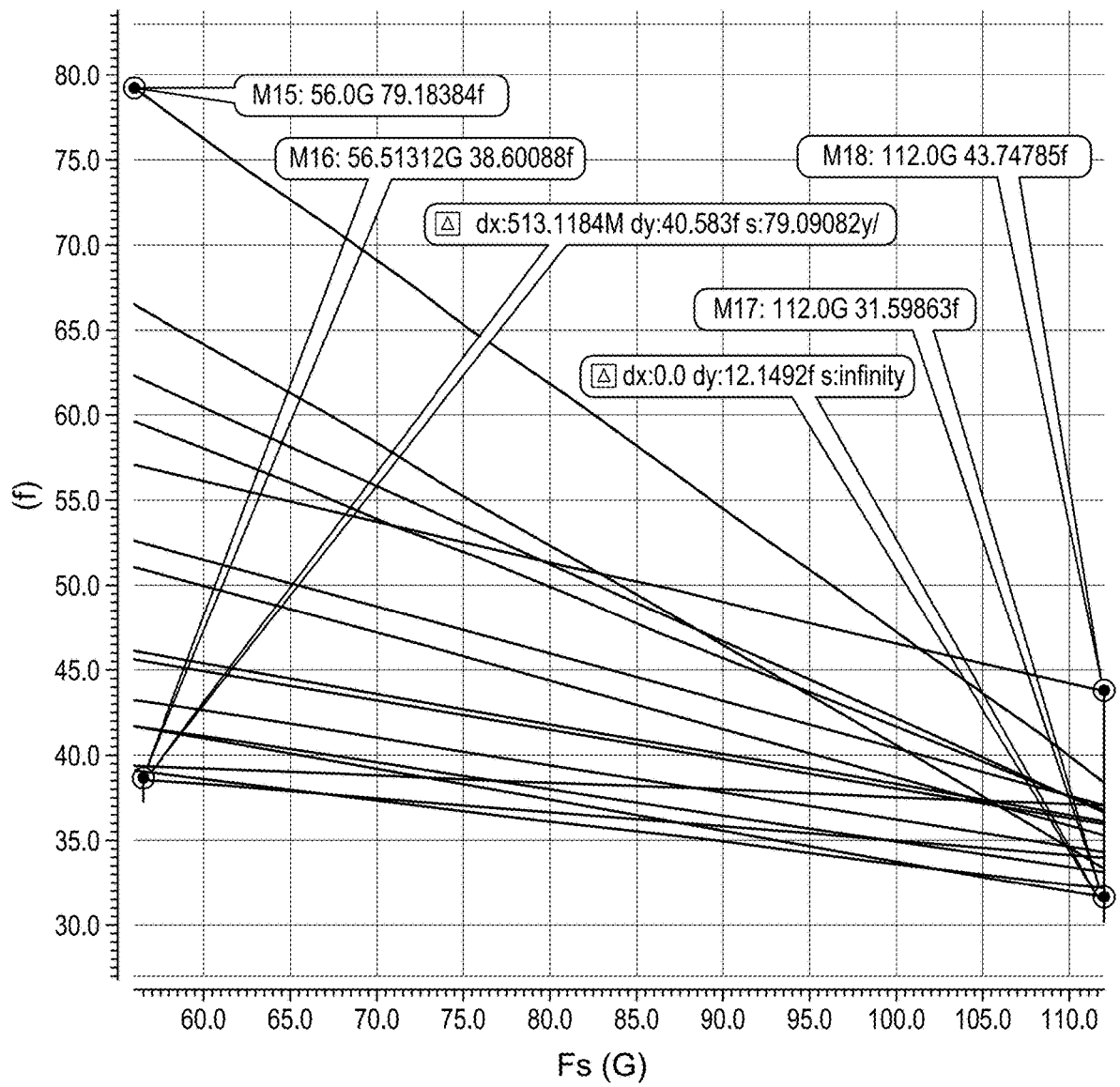
FIGS. 5E & 5F illustrate graphs of jitter of the clock and deskew stages measured on both the rising and falling edges at 3.5-GHz and 7-GHz.
Figure 5F:
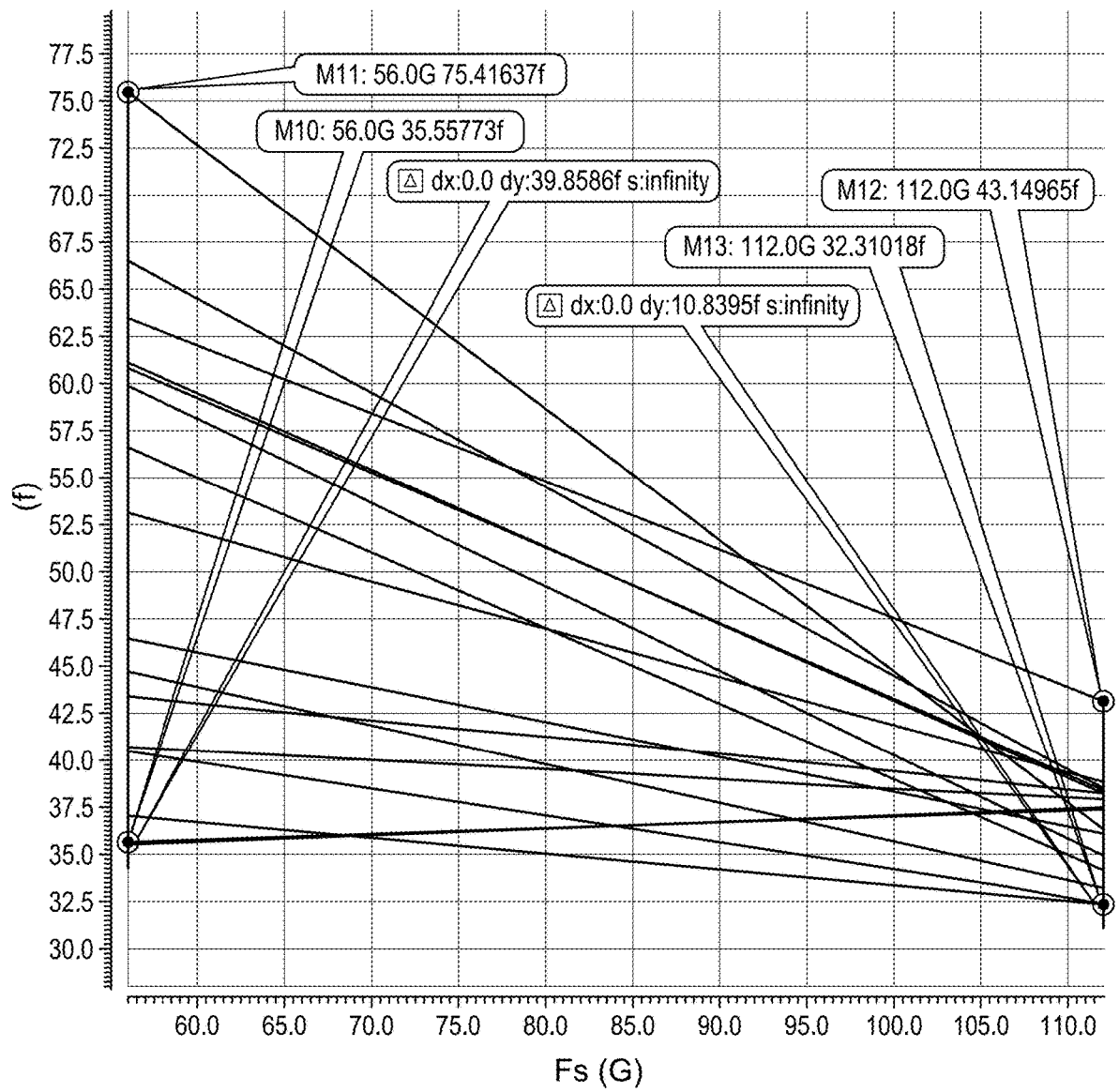

FIGS. 5E & 5F illustrate graphs of jitter of the clock and deskew stages measured on both the rising (left) and falling edge (right) at 3.5-GHz and 7-GHz. The simulated jitter of the 15 phases is shown in graphs 510 and 511. At 7-GHz the jitter ranges from 30-45 fs (rms), control code dependent. At 3.5-GHz the jitter ranges from 40-75 fs (rms), control code dependent. These are extremely low values for MPCG/deskew and allow the inner clock generation to meet state-of-the-art jitter standards.

Figure 5G:
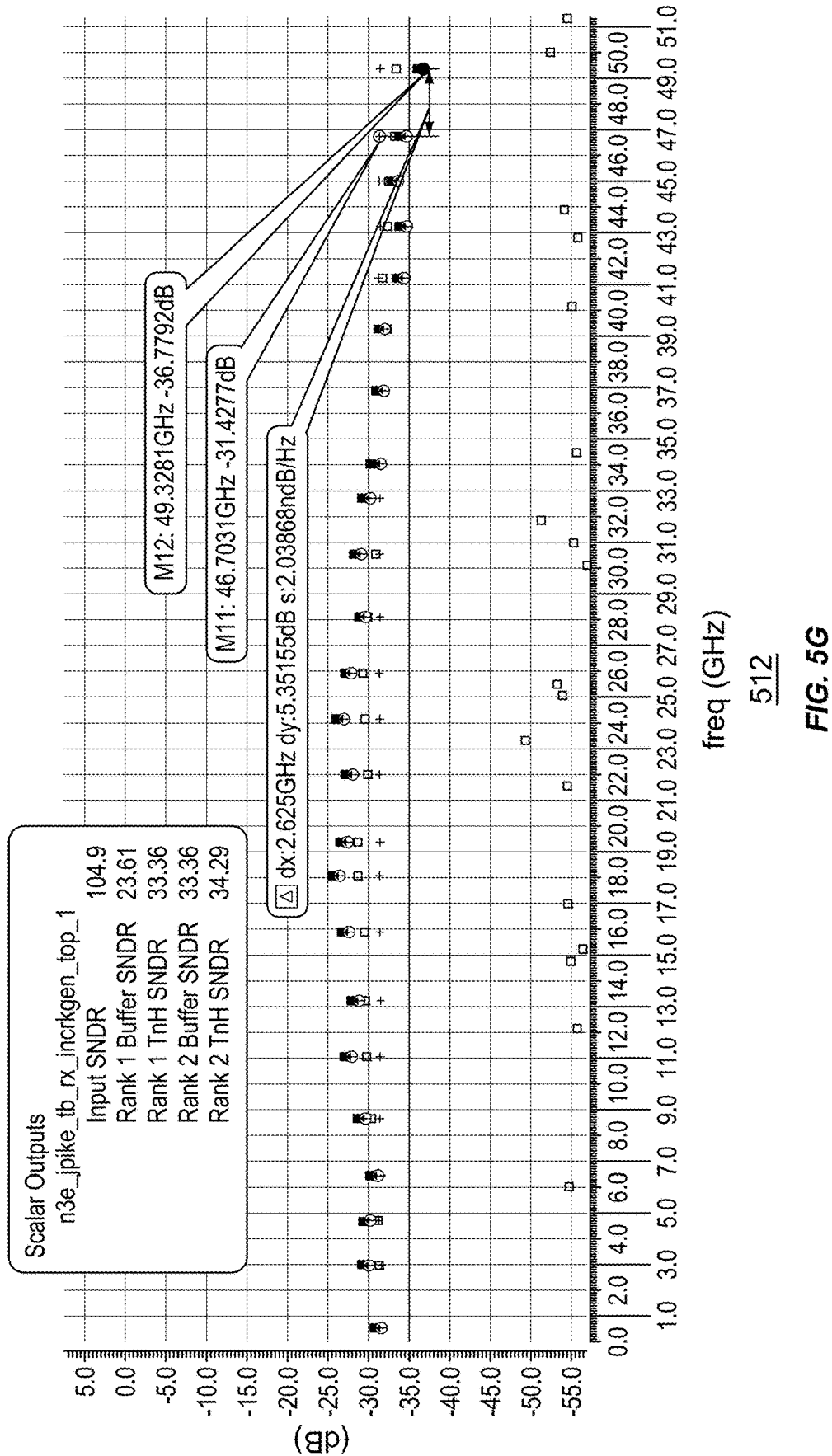
FIG. 5G illustrates a graph of output spectrum at various stages of data path with the full clock path in place.

FIG. 5G illustrates a graph of output spectrum at various stages of data path with the full clock path in place. SNDR values at various stages are also measured. The complete test chip data path and clock path has also been simulated. A critical measurement of the clock path's effect on the data path is given by the SNDR at the output of the data path where both skew and jitter will degrade the SNDR. As shown in graph 512, with the data path operating at 112-GS/s and in absence of the clock path (using perfect reference clocks) the simulated SNDR is 34.7 dB at the output of the data path. In presence of the clock path, with the clocks roughly deskewed, the SNDR only drops to 34.3 dB. This simulation demonstrates the minimal effect of the clock path on the data path performance. Results can be further improved in measurement where not limited by extremely long simulation times.

Figure 6:
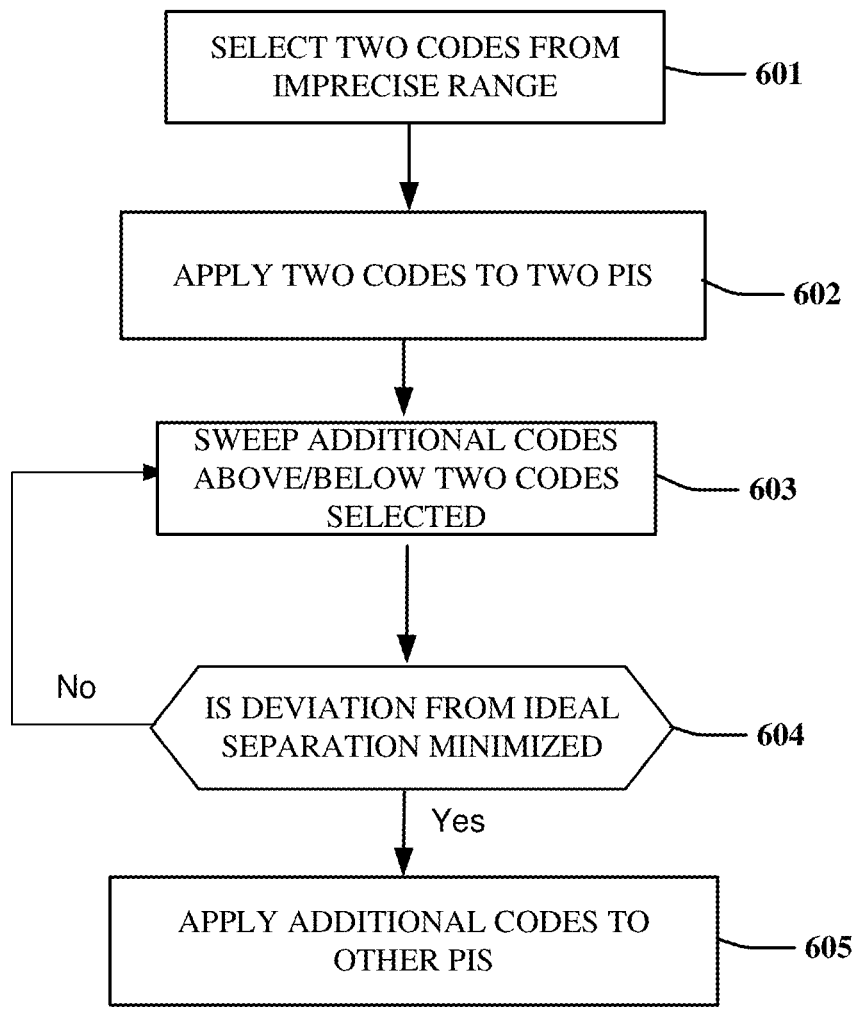
FIG. 6 depicts an illustrative embodiment of a method of calibrating digital phase interpolators in a multiphase clock generator in accordance with various aspects described herein.

FIG. 6 depicts an illustrative embodiment of a method of calibrating digital phase interpolators in a multiphase clock generator in accordance with various aspects described herein. As shown in FIG. 6, method 600 begins at step 601 where the system selects two codes from an imprecise range of the digital phase interpolator. Each digital phase interpolator has inherent non-linearities due to the design and manufacture of the PI. The system may discover where the least precise range of the digital phase interpolators occur. Next in step 602, the system applies the selected two codes to respective digital PIs that generate clock signals having minimal phase deviation from an ideal separation. For example, in an embodiment having sixteen digital PIs provided quadrature clocks, the ideal separation would be 22.5 degrees.

Next in step 603, the system sweeps through codes in the relatively more precise range to find additional codes having a minimal deviation from an ideal separation. If in step 604 the deviation is not minimized, then step 603 is repeated. However, if the deviation is minimized, then in step 605, the additional codes are applied to other digital PIs to generate clock signals and minimize the overall SNDR of data using the multiphase clock generator.

While for purposes of simplicity of explanation, the respective processes are shown and described as a series of blocks in FIG. 6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A multiphase clock generator, comprising:
a plurality of digital phase interpolators each configured to create a generated clock signal according to an applied digital code,
wherein a first digital code applied to a first digital phase interpolator of the plurality of digital phase interpolators and a second digital code applied to a second digital phase interpolator of the plurality of digital phase interpolators are chosen in a less precise range such that a first generated clock signal provided by the first digital phase interpolator deviates within an acceptable range from an ideal phase separation from a second generated clock signal provided by the second digital phase interpolator, and
wherein additional codes are applied to other digital phase interpolators of the plurality of digital phase interpolators in a more precise range to create generated clock signals having a deviation from an ideal separation from the first generated clock signal or the second generated clock signal that is less than a linear resolution of the applied digital code.

2. The multiphase clock generator of claim 1, wherein each digital phase interpolator of the plurality of digital phase interpolators comprises:
a first input clock port;
a second input clock port;
an output clock port; and
a plurality of tri-state gates having thermometer weighting code ports,
wherein the applied digital code is used to create thermometer weights provided to the thermometer weighting code ports to control the plurality of tri-state gates to create the generated clock signal,
wherein the generated clock signal is interpolated between a first clock signal applied to the first input clock port and a second clock signal applied to the second input clock port, and
wherein the generated clock signal is provided to the output clock port.

3. The multiphase clock generator of claim 2, wherein each digital phase interpolator of the plurality of digital phase interpolators further comprises: a binary to thermometer decoder that converts the applied digital code into the thermometer weights provided to the thermometer weighting code ports.

4. The multiphase clock generator of claim 3, further comprising a deskew stage comprising a plurality of deskew units, wherein each deskew unit is coupled to the output clock port of a respective digital phase interpolator of the plurality of digital phase interpolators, wherein each deskew unit comprises a second plurality of tri-state gates configured to delay an output clock signal from the respective digital phase interpolator according to a deskew code.

5. The multiphase clock generator of claim 4, wherein the second plurality of tri-state gates in each deskew unit has an identical circuit of the plurality of tri-state gates in each digital phase interpolator of the plurality of digital phase interpolators, and wherein the output clock port is coupled to both input clock ports of each deskew unit.

6. The multiphase clock generator of claim 4, wherein each digital phase interpolator of the plurality of digital phase interpolators and respective deskew unit comprises: a latch that stores the applied digital code and the deskew code, thereby enabling serialization of the applied digital code and the deskew code.

7. The multiphase clock generator of claim 4, further comprising a binary to one-hot decoder circuit configured to select each digital phase interpolator of the plurality of digital phase interpolators and a respective deskew unit when loading the applied digital code and the deskew code.

8. The multiphase clock generator of claim 4, wherein the generated clock signals from the plurality of digital phase interpolators are biased toward ranges where the deskew code provides finer deskew than provided by a number of bits in the deskew code due to a non-linearity in each deskew unit.

9. The multiphase clock generator of claim 1, wherein the first generated clock signal and the second generated clock signal are separated by ninety degrees, wherein the plurality of digital phase interpolators comprises a bank of four digital phase interpolators, wherein the ideal separation is 22.5 degrees, and wherein the acceptable range is less than two degrees.

10. The multiphase clock generator of claim 1, wherein the plurality of digital phase interpolators comprises four banks of four digital phase interpolators, and wherein the multiphase clock generator outputs sixteen different generated clock signals.

11. A multiphase clock generator, comprising:
a plurality of digital phase interpolators each configured to create a generated clock signal according to an applied digital code, wherein each digital phase interpolator of the plurality of digital phase interpolators comprises:
a first input clock port;
a second input clock port;
an output clock port;
a plurality of tri-state gates having thermometer weighting code ports; and
a binary to thermometer decoder that converts the applied digital code into thermometer weights provided to the thermometer weighting code ports to control the plurality of tri-state gates to interpolate between a first clock signal applied to the first input clock port and a second clock signal applied to the second input clock port to create the generated clock signal,
wherein the generated clock signal is provided to the output clock port.

12. The multiphase clock generator of claim 11, wherein a first digital code applied to a first digital phase interpolator of the plurality of digital phase interpolators and a second digital code applied to a second digital phase interpolator of the plurality of digital phase interpolators are chosen in a less precise range such that a first generated clock signal provided by the first digital phase interpolator is as close to an ideal phase separation from a second generated clock signal provided by the second digital phase interpolator, and wherein additional codes are applied to other digital phase interpolators of the plurality of digital phase interpolators in a more precise range to generate clock signals having a deviation from an ideal separation from the first generated clock signal or the second generated clock signal that is less than a linear resolution of the applied digital code.

13. The multiphase clock generator of claim 11, further comprising a deskew stage comprising a plurality of deskew units, wherein each deskew unit is coupled to the output clock port of a respective digital phase interpolator of the plurality of digital phase interpolators, wherein each deskew unit comprises a second plurality of tri-state gates configured to delay an output clock signal from the respective digital phase interpolator according to a deskew code.

14. The multiphase clock generator of claim 13, wherein the second plurality of tri-state gates in each deskew unit has an identical circuit of the plurality of tri-state gates in each digital phase interpolator of the plurality of digital phase interpolators, and wherein the output clock port is coupled to both input clock ports of each deskew unit.

15. The multiphase clock generator of claim 13, wherein each digital phase interpolator of the plurality of digital phase interpolators and respective deskew unit comprises: a latch that stores the applied digital code and the deskew code, thereby enabling serialization of the applied digital code and the deskew code.

16. The multiphase clock generator of claim 13, further comprising a binary to one-hot decoder circuit configured to select each digital phase interpolator of the plurality of digital phase interpolators and respective deskew unit when loading the applied digital code and the deskew code.

17. The multiphase clock generator of claim 16, wherein the generated clock signal provided by each digital phase interpolator is biased toward ranges where the deskew code provides finer deskew than provided by a number of bits in the deskew code due to a non-linearity in the respective deskew unit.

18. The multiphase clock generator of claim 11, wherein the first clock signal and the second clock signal are separated by ninety degrees and wherein the plurality of digital phase interpolators comprises a bank of four digital phase interpolators.

19. The multiphase clock generator of claim 11, wherein the plurality of digital phase interpolators comprises four banks of four digital phase interpolators, and wherein the multiphase clock generator outputs sixteen different generated clock signals.

20. A method, comprising:
selecting, by a processing system including a processor, a first digital code and a second digital code in a less precise range of clock signals generated by each digital phase interpolator of a plurality of digital phase interpolators, wherein the first digital code and the second digital code are selected such that the clock signals generated by each digital phase interpolator have a phase separation as close as possible to an ideal phase separation;
applying, by the processing system, the first digital code to a first digital phase interpolator of the plurality of digital phase interpolators, which creates a first generated clock signal;
applying, by the processing system, the second digital code to a second digital phase interpolator of the plurality of digital phase interpolators, which creates a second generated clock signal;

selecting, by the processing system, additional codes for other digital phase interpolators of the plurality of digital phase interpolators in a more precise range to generate the clock signals, thereby reducing a deviation from an ideal separation from the first generated clock signal or the second generated clock signal, wherein the deviation is less than a linear resolution of the additional codes; and applying, by the processing system, the additional codes to the other digital phase interpolators.

* * * * *